(12) United States Patent
Dyer-Smith

(10) Patent No.: US 9,754,624 B2
(45) Date of Patent: Sep. 5, 2017

(54) VIDEO CREATION PLATFORM

(71) Applicant: Wooshii Ltd, London (GB)

(72) Inventor: Fergus Dyer-Smith, London (GB)

(73) Assignee: WOOSHII LTD, London (GB)

( * ) Notice: Subject to any disclaimer, the term of this patent is extended or adjusted under 35 U.S.C. 154(b) by 0 days.

(21) Appl. No.: 14/536,595

(22) Filed: Nov. 8, 2014

(65) Prior Publication Data
US 2016/0133294 A1    May 12, 2016

(51) Int. Cl.
| | |
|---|---|
| H04N 5/445 | (2011.01) |
| G11B 27/031 | (2006.01) |
| G06Q 10/10 | (2012.01) |
| H04N 21/8547 | (2011.01) |
| H04N 21/4788 | (2011.01) |
| H04N 21/488 | (2011.01) |
| H04N 21/472 | (2011.01) |

(52) U.S. Cl.
CPC ......... *G11B 27/031* (2013.01); *G06Q 10/101* (2013.01); *H04N 21/4788* (2013.01); *H04N 21/47205* (2013.01); *H04N 21/4882* (2013.01); *H04N 21/8547* (2013.01)

(58) Field of Classification Search
CPC . H04N 21/47; H04N 21/472; H04N 21/47205
USPC .................................................. 725/37, 47
See application file for complete search history.

(56) References Cited

U.S. PATENT DOCUMENTS

| | | | | |
|---|---|---|---|---|
| 7,434,155 | B2 * | 10/2008 | Lee | G11B 27/034 348/423.1 |
| 7,769,819 | B2 | 8/2010 | Lerman et al. | |
| 7,809,802 | B2 | 10/2010 | Lerman et al. | |
| 7,917,448 | B2 * | 3/2011 | Smola | G06F 17/30861 705/319 |
| 8,341,525 | B1 * | 12/2012 | Achour | G06Q 10/101 715/201 |
| 8,818,175 | B2 * | 8/2014 | Dubin | H04N 9/87 386/282 |
| 8,910,051 | B2 * | 12/2014 | Lussier | G11B 27/034 386/281 |
| 9,021,357 | B2 * | 4/2015 | Auterinen | G06F 17/30056 715/720 |
| 9,032,297 | B2 * | 5/2015 | Lovejoy | G11B 27/034 715/723 |
| 9,129,640 | B2 * | 9/2015 | Hamer | H04N 21/21805 |
| 9,130,892 | B2 * | 9/2015 | Singh | H04L 51/04 |
| 9,215,514 | B1 * | 12/2015 | Kline | G06Q 10/10 |

(Continued)

*Primary Examiner* — James R Sheleheda

(57) ABSTRACT

A computer-implemented method for creation of a video project includes uploading a starting video to a data storage of a media management server, the starting video having a plurality of starting frames each having a distinct starting video time stamp, generating a first user interface to a media display of a first client computing device, presenting the starting video through the first user interface, modifying the starting video in response to user input through the first user interface to produce an updated video having a plurality of updated frames each having a distinct updated video time stamp, associating one or more comments to the updated and starting frames, and presenting the one or more comments along with the starting video and the updated video through the first user interface as a topical, chronological thread in accordance with the chronologic indicators.

20 Claims, 5 Drawing Sheets

(56) References Cited

U.S. PATENT DOCUMENTS

| | | | | |
|---|---|---|---|---|
| 9,240,022 B2* | 1/2016 | Treyz | ............... | G06Q 30/0601 |
| 9,514,424 B2* | 12/2016 | Kleinbart | ............... | G06Q 10/06 |
| 2006/0161838 A1* | 7/2006 | Nydam | ............... | G06F 17/241 |
| | | | | 715/202 |
| 2006/0206526 A1* | 9/2006 | Sitomer | ............... | G11B 27/034 |
| 2006/0265657 A1* | 11/2006 | Gilley | ............... | G06Q 30/02 |
| | | | | 715/730 |
| 2007/0067297 A1* | 3/2007 | Kublickis | ............... | G06Q 30/02 |
| 2007/0136656 A1* | 6/2007 | Nydam | ............... | G06F 17/24 |
| | | | | 715/205 |
| 2007/0201815 A1* | 8/2007 | Griffin | ............... | G11B 27/034 |
| | | | | 386/231 |
| 2009/0238538 A1 | 9/2009 | Fink | | |
| 2009/0288010 A1* | 11/2009 | Ubillos | ............... | G11B 27/034 |
| | | | | 715/720 |
| 2010/0119203 A1* | 5/2010 | Lewis | ............... | G06Q 30/0284 |
| | | | | 386/278 |
| 2010/0135598 A1* | 6/2010 | Olwen | ............... | G06F 17/30017 |
| | | | | 382/306 |
| 2011/0026898 A1 | 2/2011 | Lussier et al. | | |
| 2011/0030031 A1* | 2/2011 | Lussier | ............... | G11B 27/034 |
| | | | | 726/1 |
| 2011/0289413 A1* | 11/2011 | Ubillos | ............... | G11B 27/031 |
| | | | | 715/723 |
| 2011/0313920 A1* | 12/2011 | Trickel | ............... | G06Q 10/06 |
| | | | | 705/40 |
| 2012/0278388 A1* | 11/2012 | Kleinbart | ............... | G06Q 10/10 |
| | | | | 709/204 |
| 2012/0311448 A1* | 12/2012 | Achour | ............... | G06Q 10/101 |
| | | | | 715/723 |
| 2013/0173690 A1* | 7/2013 | Gregg | ............... | H04N 21/222 |
| | | | | 709/203 |
| 2013/0216206 A1* | 8/2013 | Dubin | ............... | H04N 7/155 |
| | | | | 386/282 |
| 2014/0006978 A1 | 1/2014 | Meehan | | |
| 2014/0115440 A1* | 4/2014 | Datar | ............... | G06F 17/30817 |
| | | | | 715/230 |
| 2014/0195420 A1* | 7/2014 | Trickel | ............... | G06Q 20/10 |
| | | | | 705/40 |
| 2014/0310746 A1* | 10/2014 | Larsen | ............... | G06Q 10/10 |
| | | | | 725/37 |
| 2015/0117840 A1* | 4/2015 | Parente | ............... | H04N 21/47205 |
| | | | | 386/282 |
| 2015/0208023 A1* | 7/2015 | Boyle | ............... | H04N 7/00 |
| | | | | 386/278 |
| 2015/0262615 A1* | 9/2015 | Rav-Acha | ............... | G11B 27/031 |
| | | | | 386/281 |
| 2015/0317582 A1* | 11/2015 | Nath | ............... | G06Q 10/06 |
| | | | | 705/7.13 |
| 2015/0358581 A1* | 12/2015 | Zhou | ............... | H04N 7/147 |
| | | | | 348/14.07 |
| 2016/0246477 A1* | 8/2016 | Eidelson | ............... | H04M 1/72552 |
| 2016/0277342 A1* | 9/2016 | Shi | ............... | H04L 51/04 |
| 2016/0299658 A1* | 10/2016 | Langholz | ............... | H04L 51/04 |
| 2017/0026333 A1* | 1/2017 | Pitroda | ............... | H04L 51/14 |
| 2017/0054663 A1* | 2/2017 | Geiger | ............... | H04L 51/10 |

* cited by examiner

VIDEO CREATION PLATFORM

TECHNICAL FIELD

The present disclosure generally relates to a video creation platform, and more specifically relates to a system and method that supports buyers and creators in the management of video creation and delivery processes.

BACKGROUND

Video creation and delivery frequently involves usage of many software tools, databases and communication channels, each functioning independently to serve a specific need. With the help of these tools, databases and communication channels, a creator can effectively create a video and deliver to a buyer. If the buyer desires revisions be made to the delivered video, he may communicate the same to the creator, the creator may subsequently revise the video according to the buyer's requirements, and send it again to the buyer. However, many times, many iterations take place before a video is finalized by the buyer, and the creator has to redo everything in order to satisfy buyer's criteria. This results in inefficient use of resources and time of both creator and buyer. There is no set manner in which the videos should be created, modified and delivered between creators and buyers. Also, there are no specific payment conditions associated with the video project, and sometimes the creator may not receive any compensation until the final video is approved by the buyer.

A need exists for a video creation platform that supports creators and buyers in the effective management of video creation processes, reduces the transactional cost, steps and time involved in the management of video creation, and that overcomes the limitations of existing video creation and delivery tools.

SUMMARY

The present disclosure seeks to provide a method for creation of a video project.

The method for creation of a video project may be computer-implemented and includes uploading a starting video to a data storage operatively coupled with a media management server. The starting video has a plurality of starting frames each having a distinct starting video time stamp. The method further includes generating a first user interface through a communications network to a media display of a first client computing device, presenting the starting video through the first user interface, and modifying the starting video in response to user input through the first user interface to produce an updated video. The updated video has a plurality of updated frames, each having a distinct updated video time stamp corresponding to the distinct starting video time stamps of the starting frames. In response to comment input through the first user interface, one or more comments pertaining to the updated frames, the starting frames or both, are associated with the corresponding updated frames, the starting frames or both of these, respectively. The associating the one or more comments further includes tagging each comment with a chronologic indicator. Further, the comments are presented along with the starting video and the updated video through the first user interface as a topical, chronological thread in accordance with the chronologic indicators.

In accordance with an embodiment of the present disclosure, presenting the starting video and the updated video through the user interface further comprises presenting simultaneously such that each presented starting frame is synchronized with an updated frame which has a distinct updated video time stamp corresponding to the distinct starting video time stamp of the presented starting frame.

In accordance with an embodiment of the present disclosure, the method further includes presenting the starting video and the updated video through the user interface simultaneously such that no presented starting frame is synchronized with any updated frame which has a distinct updated video time stamp corresponding to the distinct starting video time stamp of the presented starting frame.

In accordance with an embodiment of the present disclosure, the method further includes programming a compensation timeline with the first user interface such that individual successive video creation tasks of the video project are associated with individual partial payments of a total video project compensation.

In accordance with an embodiment of the present disclosure, the method includes forwarding, to a second client computing device, a request for one of the individual partial payments when the associated one of the individual successive video creation tasks is completed.

In accordance with an embodiment of the present disclosure, the method includes delivering one or more messages regarding the starting video, the updated video, the one or more comments or all of these from a first user interface to a second user interface through the user video creation server in real time.

In accordance with an embodiment of the present disclosure, wherein modifying the starting video further includes adding annotations directly to one or more of the frames of the starting video.

In accordance with an embodiment of the present disclosure, the associating the comment may further include associating the comment with a single starting frame or a single updated frame when comment input is received while the single updated frame or the single starting frame is being presented.

In accordance with an embodiment of the present disclosure, the method further includes presenting the updated frames in response to a user engaging the associated comment through the first user interface.

In accordance with an embodiment of the present disclosure, the method further includes transmitting the comments, the timestamps and the updated video to a remote memory device.

In accordance with an embodiment of the present disclosure, the method further includes transmitting an invitation to a second user interface in response to a user employing the first user interface to grant an access permission to a user of the second user interface.

The present disclosure also seeks to provide a system for creation of a video project.

The system for creation of a video project includes a media management server, a data storage, a memory, a processing unit and a network interface. The media management server is configured to employ the network interface to receive, over a communications network and from a first client computing device, a starting video. The starting video has a plurality of starting frames each having a distinct starting video time stamp. The media management server is configured to store the starting video at the data storage. The media management server is further configured to employ the communications network to generate a first user interface to a media display of the client computing device and present the stored starting video through the first user interface. The media management server is furthermore configured to modify the stored starting video in response to user input through the first user interface to produce an updated video. The updated video has a plurality of updated frames each having a distinct updated video time stamp corresponding to the distinct starting video time stamps of the starting frames. The media management server is furthermore configured to store the updated video at the data storage. In response to comment input through the first user interface, the media management server is configured to associate comments pertaining to the updated frames, the starting frames or both, with the plurality of updated frames, the starting frames or both of these, respectively. The media management server is furthermore configured to tag each comment with a chronologic indicator, and present one or more comments along with the starting video and the updated video to the first user interface as a topical, chronological thread, in accordance with the chronologic indicators.

In accordance with an embodiment of the present disclosure, the media management server is furthermore configured to present the starting video and the updated video through the first user interface simultaneously such that each presented starting frame is synchronized with an updated frame which has a distinct updated video time stamp corresponding to the distinct starting video time stamp of the presented starting frame.

In accordance with an embodiment of the present disclosure, the media management server is furthermore configured to present the starting video and the updated video through the user interface simultaneously such that no presented starting frame is synchronized with any updated frame which has a distinct updated video time stamp corresponding to the distinct starting video time stamp of the presented starting frame.

In accordance with an embodiment of the present disclosure, the media management server is furthermore configured to receive input through the first user interface to program a compensation timeline such that individual successive video creation tasks of the video project are associated with individual partial payments of a total video project compensation.

In accordance with an embodiment of the present disclosure, when one of the individual successive video creation tasks is completed, the media management server is further configured to employ the network interface to forward, over the communications network and to a second client computing device, a request for the individual partial payment associated with the completed successive video creation tasks.

In accordance with an embodiment of the present disclosure, the media management server is furthermore configured to employ the network interface to send, through the communications network to a second user interface, real-time private messages input from the first user interface and regarding the starting video, the updated video, the comments or all of these.

In accordance with an embodiment of the present disclosure, the media management server is further configured to modify the starting video further by adding annotations directly to the starting frames.

In accordance with an embodiment of the present disclosure, when comment input is received while a single updated frame or the starting frame is being presented, the media management server is configured to associate the comment with the single frame.

In accordance with an embodiment of the present disclosure, the media management server is furthermore configured to present the updated frames in response to a user engaging the associated comment through the first user interface.

In accordance with an embodiment of the present disclosure, the media management server is furthermore configured to employ the network interface to transmit, over the communications network, an invitation to a second user interface in response to a user employing the first user interface to grant an access permission to a user of the second user interface.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those having ordinary skill in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and manners by which they can be implemented. Although the best mode of carrying out the present methods and systems has been disclosed, those skilled in the art would recognize that other embodiments for the carrying out or practicing thereof are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

While existing video editing tools enable editing of video clips displayed within a user interface of a browser application and often include browser-based clip manipulation methods and systems for rendering and editing a video clip, these video editing tools enable editing of videos only at a creator's computing device. There is no involvement of the buyer during the editing and modification of the video clips. Excluding the buyer during editing of the video clips may result in video editions which may not be approved by the buyer later on.

Other video creation tools facilitate creation of on-line personalized multimedia files, and more specifically creation of a personalized documentary video file or movie incorporating user-supplied digital images and home movies combined with archival stock video footage, and mixed and/or synchronized with a musical soundtrack. Some other existing media editing tools enable the user to assemble multiple items of media content to create a media project. However, in these tools too, there is no involvement of the buyer during the editing and modification of the videos.

Therefore, there is a need for a video creation platform which supports creators and buyers in the effective management of video creation, reduces the transactional cost, steps and time involved in the management of video creation, and which overcomes the limitations of the existing video creation and delivery tools.

Figure 1:
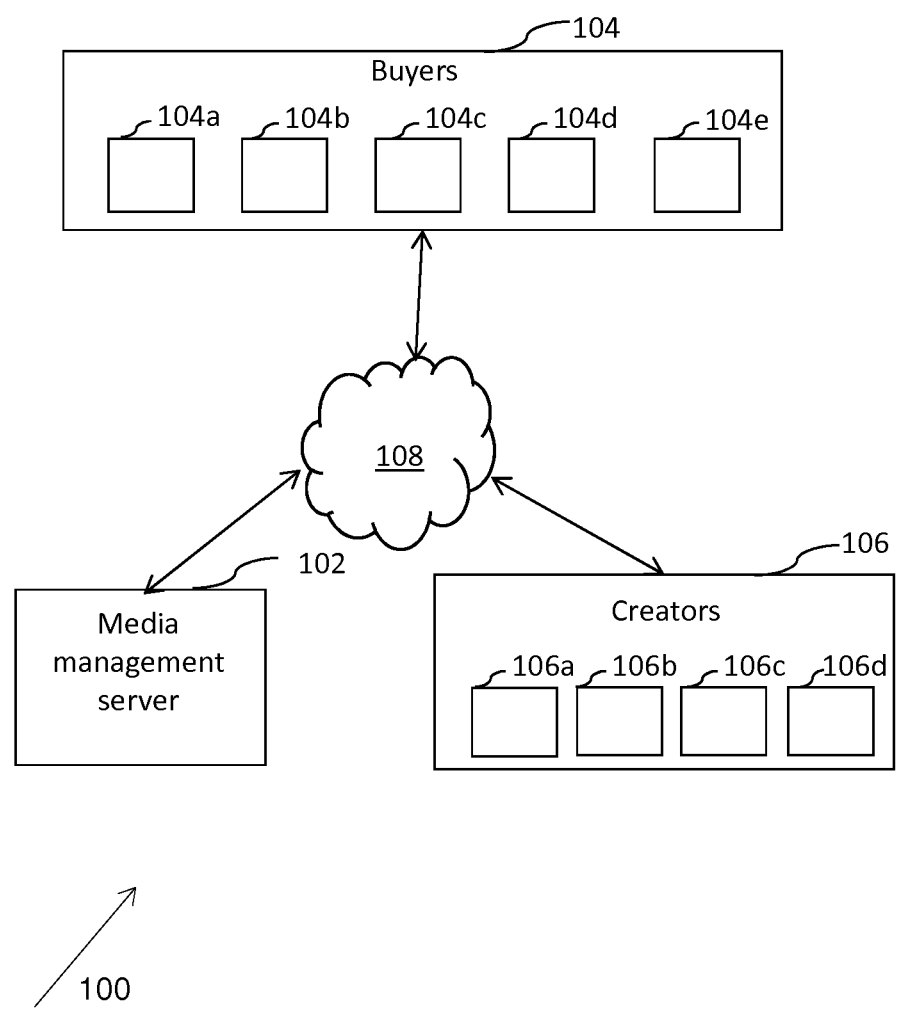
FIG. 1 is a schematic illustration of a network environment that is suitable for practicing embodiments of the present disclosure.

FIG. 1 is a schematic illustration of a network environment 100 that is suitable for practicing embodiments of the present disclosure. The environment 100 includes a media management server 102, first through fifth buyers 104a, 104b, 104c, 104d and 104e (hereinafter collectively referred to as buyers 104), and first through fourth creators such as creators 106a through 106d (hereinafter collectively referred to as creators 106).

Each of the buyers 104 and creators 106 utilizes a client computing device for connecting to the media management server 102 through the communication network 108. Examples of such computing device, include, but are not limited to, a personal computer, a laptop, a mobile phone, a smart-phone or any other device capable of data communication. Examples of the communication network 108 may include wired or wireless network, such as but not limited to, a Local Area Network (LAN), a Wide Area Network (WAN), a Wi-Fi network and so forth.

The creators 106 include a group of users who create videos using their respective client computing devices. They may include individuals or organisation(s) dedicated to the creation of videos. The buyers 104 include a group of users who wish to buy the created videos using their respective computing devices. They may include individuals or organisation(s) interested in buying the videos through provision of the requisite payments.

The media management server 102 provides a video creation platform at the client computing devices of the creators 106 and buyers 104 to enable them to interact with each other in all aspects of video creation and delivery. In one embodiment of the present disclosure, the video creation platform provides user interfaces at the display of client computing devices of the creators 106 and buyers 104, for facilitating real-time interaction among the creators 106 and buyers 104 during the creation, upload, editing and delivery of the video content.

Figure 2:
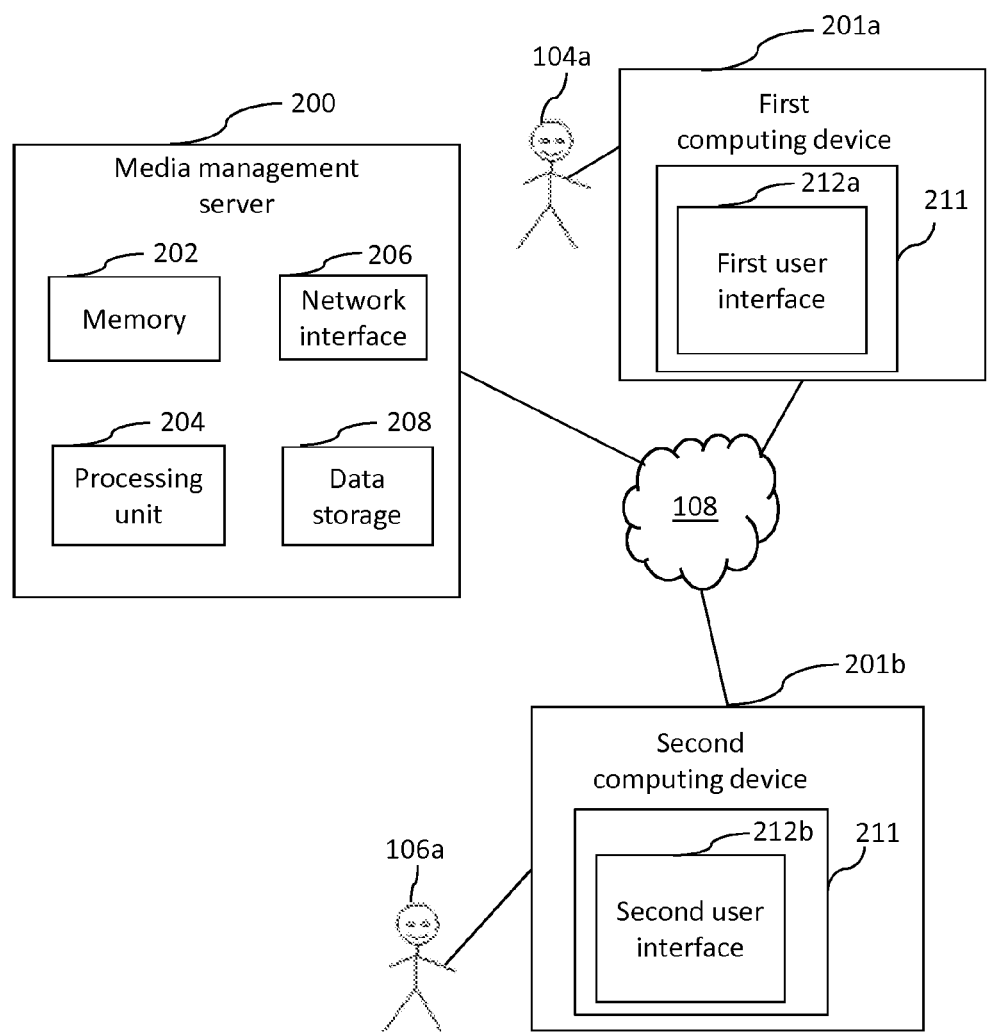
FIG. 2 is a schematic illustration of the media management server for facilitating creation of a video project.

FIG. 2 is a schematic illustration of a media management server 200, which is an example of the media managment server 102, for facilitating creation and delivery of a video project, in accordance with an embodiment of the present disclosure.

The media management server 200 cooperates with a memory 202, a processing unit 204, a network interface 206, and a data storage 208, and may be implemented using hardware, software, or a combination of both. The memory 202 includes an instruction set, where the instruction set includes a plurality of executable instructions, for implementing a video creation platform 211 at first and second client computing devices 201a and 201b, when executed by the processing unit 204. The network interface 206 facilitates connection and communication with the first and second client computing devices 201a and 201b through the communication network 108. The data storage 208 facilitates storing of pre-recorded videos, videos uploaded by the creators 106, edited videos, feedback/comments of the buyers 104, videos bought by the buyers 104, transactions between the creators 106 and buyers 104, profiles of the creators 106 and buyers 104, etc.

The first client computing device 201a belongs to a buyer, such as the first buyer 104a, and the second client computing device 201b belongs to a creator, such as the first creator 106a. In one embodiment, each of the first and second client computing devices 201a and 201b executes a web application of the media management server 200 in respective web browsers for implementing the video creation platform 211. In another embodiment, the first and second client computing devices 201a and 201b are mobile devices, each executing a mobile application of the media management server 200 for implementing the video creation platform 211.

The video creation platform 211 enables display of first and second user interfaces 212a and 212b, in the web browsers of the first and second client computing devices 201a and 201b respectively. The first and second user interfaces 212a and 212b facilitate real-time interaction between the first buyer 104a and first creator 106a during the creation, upload, editing and delivery of the video content. In one embodiment, the first and second user interfaces 212a and 212b are almost identical in nature and display. The first user interface 212a is hereinafter referred to as buyer interface 212a, and the second user interface 212b is hereinafter referred to as a creator interface 212b.

The buyer interface 212a enables the first buyer 104a to create a project outline stating their requirements and budget for a new video project. In one embodiment, the first buyer 104a may register themselves with the video creation platform 211 through a login icon on the buyer interface 212a, and create a new project requirement. In another embodiment, the data storage 208 stores the video projects completed in the past and corresponding budgets. For a current project requirement posted by the first buyer 104a, the video creation platform 211 may enable comparison of the budget quoted by the first buyer 104a with recommended budgets of video projects of similar nature, and may provide suggestions to the first buyer 104a to quote an increased/decreased budget.

As soon as a new video project requirement is posted, a set of creators 106 (registered with the video creation platform 211 and potentially present at distinct geographical locations) may receive an automatic notification/alert, via email/SMS. The set of creators 106 may respond to the new project requirement using their respective user interfaces. The first buyer 104a analyses the proposals and portfolios of the set of creators 106, and in an example scenario, approves the proposal of the first creator 106a (user of the second computing device 201b). After the proposal is approved by the first buyer 104a, the first creator 106a may receive an automatic notification/alert for uploading one or more video files.

The creator interface 212b facilitates the first creator 106a to upload one or more video files onto the video creation platform 211. In one embodiment, the first creator 106a selects a video file from a local storage of the second computing device 201b and uploads it therein. The video file uploaded by the first creator 106a is hereinafter also referred to as a starting video file. The starting video has a plurality of starting frames, each having a distinct starting video time stamp. In case connectivity between the media management server 200 and the second client computing device 201b is lost during upload of the starting video file, the file upload can be resumed within a given time frame from the point it was disconnected. In one embodiment, the processing unit 204 compresses, optimizes, and converts the files uploaded by the first creator 106a into smaller sized files, and saves them in the data storage 208.

As soon as the first creator 106a uploads the starting video file, a notification/alert may be automatically sent to the first buyer 104a. In one embodiment, the creator interface 212a facilitates the first creator 106a to send an invitation to the first buyer 104a to enable them to access the starting video file uploaded by the first creator 106a. The first buyer 104a may then download the starting video file using their buyer interface 212a, and play it using a video player embedded therein.

In one embodiment, the creator interface 212b enables the first creator 106a to turn on or off the ability of downloading of the starting video file by another user, such as the first buyer 104a. For example, if the downloading function is turned on, then the first buyer 104a or another user is able to download the starting video file and/or converted video file. If the downloading function is turned off, no user is able to download the starting video file and/or compressed versions of the starting video file uploaded by the first creator 106a.

The video creation platform 211 further supports a message conversation thread between the first buyer 104a and first creator 106a at their respective interfaces 212a and 212b in respective web browsers, to enable them to share messages, images and videos. In one embodiment, each of the first buyer 104a and creator 106a, can invite other users to participate and comment in the message conversation thread. The inviting user can assign permissions to the invited user and prevent them from viewing one or more aspects of the message conversation thread. In another embodiment, the inviting user may create corresponding sub-threads that can be viewed by the invited user. In the sub-threads, the users can share private message regarding the starting video, and the associated one or more comments.

The video creation platform 211 further supports real-time markup of the video files played in the video player embedded in the interfaces 212a and 212b. In an example, the first buyer 104a may play the starting video file at the buyer interface 212a and pause the starting video file at any point to provide mark-up comment(s) in real-time. In one embodiment, the pausing playback of the starting video causes presentation of a single starting frame, and the mark-up comment provided by the first buyer 104a is associated with the presented starting frame and the corresponding starting time stamp. The mark-up comments may include text, images, or diagrams, and may be added as annotations to the frames of the starting video, where each annotation is associated with a unique time stamp.

The video creation platform 211 facilitates tagging of the mark-up comment(s) with chronologic indicator(s) such that comments may be displayed to a user in a chronological order, and are automatically linked to corresponding time point in the starting video file. In one embodiment, the mark-up comments and annotations are displayed inline in the message conversation thread between the first buyer 104a and the first creator 106a, as a topical, chronological thread in accordance with the chronologic indicators. The mark-up comments and annotations may be stored in the data storage 208 as an acompanying database file, and the database entries are linked to timestamps in the starting video file, such that when the marked-up starting video file is played, clicking a timestamp automatically moves the video player to the time point in the video that the timestamp references.

In one embodiment, the creator interface 212a enables the first creator 106a to download all mark-up comments pertaining to the starting video in a form that can be imported into other services such as video editing software or project management tools. Based on the mark-up comments, the first creator 106a may modify/edit the starting video file to generate an updated video file, to incorporate the feedback of the first buyer 104a. The creator 106a may then upload the updated video file onto the video creation platform 211. The updated video has a plurality of updated frames each having a distinct updated video time stamp corresponding to the distinct starting video time stamps of the starting frames.

In one embodiment, the starting video file and updated video file are linked with each other and are marked as two versions in the data storage 208. In another embodiment, one or more video files and associated mark-up comments are stored in the data storage 208, and can be retreived therefrom using a file management tool of the video creation platform 211 for viewing in the message conversation thread. In yet another embodiment, the comments, timestamps and the updated video stored in the data storage 208 may be transmitted to a remote memory device (not shown).

The video creation platform 211 further enables simultaneous display of both the versions, i.e. starting video and updated video file in the message conversation thread between the first buyer 104a and first creator 106a. In one embodiment, the starting video and the updated video are presented simultaneously such that each presented starting frame is synchronized with an updated frame which has a distinct updated video time stamp, corresponding to the distinct starting video time stamp of the presented starting frame. In another embodiment, the starting video and the updated video are presented simultaneously such that no presented starting frame is synchronized with any updated frame which has a distinct updated video time stamp corresponding to the distinct starting video time stamp of the presented starting frame.

The buyer 104a may pause the updated video file and provide mark-up comment(s) in real-time, similar to the manner in which mark-up comments are provided for the starting video file. Based on the mark-up comments on the updated video, the first creator 106a may again modify/edit the updated video file to generate a further updated video file. This process is repeated until all the feedback of the first buyer 104a is incorporated by the first creator 106a, and a then current version of the starting video file is considered as a final version, and the video project creation is considered to be complete.

The video creation platform 211 further supports a payment management system on the buyer and creator interfaces 212a and 212b, to enable the first buyer 104a to make payments for the video project. In an example, the buyer interface 212a redirects the first buyer 104a to a payment page for making the payment to the first creator 106a. In one embodiment, the creator interface 212b facilitates the first creator 106a to create one or more milestones in respect of the payment of the video project, where each milestone may be linked to a certain payment condition, such that individual successive video creation tasks of the video project are associated with individual partial payments of a total video project compensation. In an example, the first milestone could be approval of proposal of video project, and corresponding payment condition could be payment of 10% of budget, second milestone could be uploading of the starting video file, and corresponding payment condition could be payment of 50% of budget, and so on. Upon completion of a milestone, the first creator 106a may request the first buyer 104a release the corresponding payment.

Figure 3:
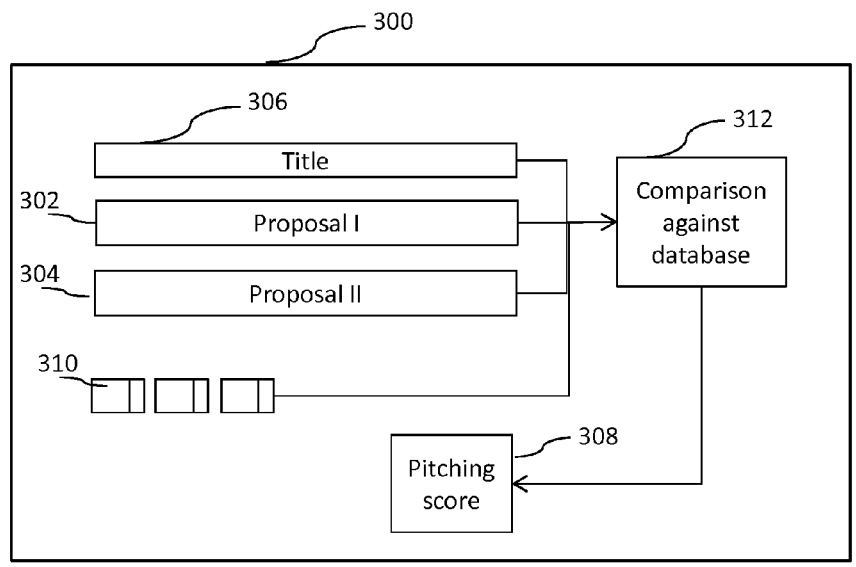
FIG. 3 is an illustration of generation of pitching scores on the user interface of the buyer, in accordance with an embodiment of the present disclosure.

FIG. 3 is an illustration of generation of pitching scores on a user interface 300, which is an example of the buyer interface 212a, in accordance with an embodiment of the present disclosure. The user interface 300 facilitates display of proposals such as first and second proposals 302 and 304 submitted by the creators 106, in response to a video project requirement (of title 306) posted by a buyer 104. The memory 202 stores a plurality of executable instructions, for enabling the processing unit 204 of the media management server 200 to generate a pitching score 308 for each submitted proposal. The pitching score 308 for a proposal is calculated based on a title 306 of the project, date 310 of posting of project, portfolio of creators 106, and comparison 312 against proposals of similar nature stored in the data storage 208. In an example, the pitching score 308 is calculated on a scale of ten, and higher the pitching score, better the proposal is for the buyer 104.

Figure 4:
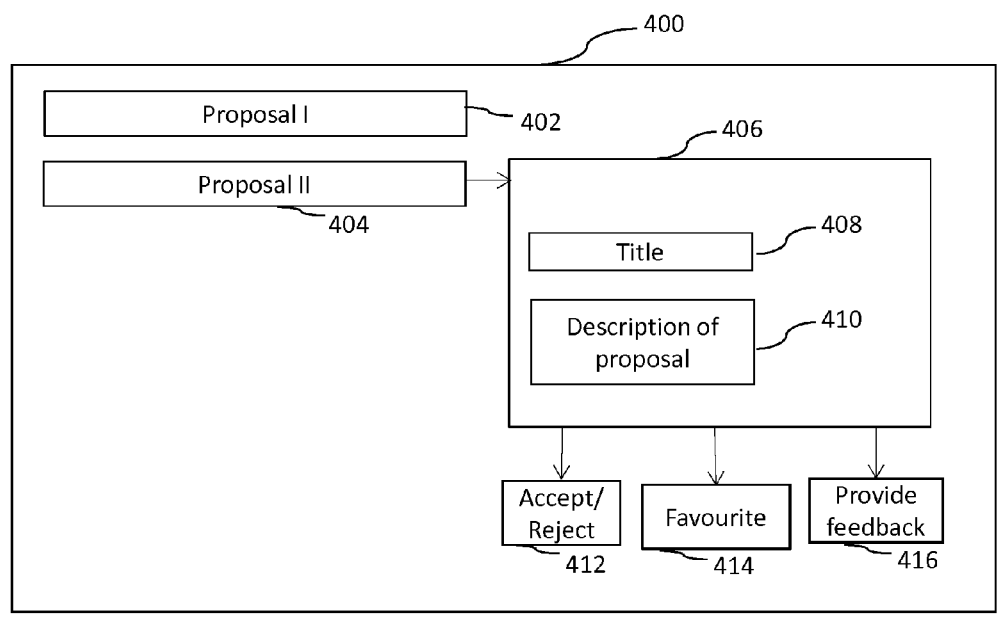
FIG. 4 is an illustration of display of proposals on the user interface of the buyer, in accordance with an embodiment of the present disclosure.

FIG. 4 is an illustration of display of proposals on a user interface 400, which is an example of the buyer interface 212a, in accordance with an embodiment of the present disclosure. The user interface 400 enables display of proposals, such as first and second proposals 402 and 404 submitted by the creators 106, in response to a video project requirement submitted by a buyer 104. In an embodiment, when a user of the user interface 400, i.e. a buyer 104, clicks/touches the second proposal 404, a box 406 displaying details of the second proposal 404 appears to the right side of the corresponding user interface. The details of the second proposal 404 include, but are not limited to, a title 408 and description 410 of the second proposal 404. Further inputs 412, 414 and 416, in respect of the second proposal 404, are displayed so as to enable the buyer 104 to accept/reject the second proposal 404, mark the second proposal 404 as favourite, and/or provide feedback on the second proposal 404, respectively.

Figure 5:
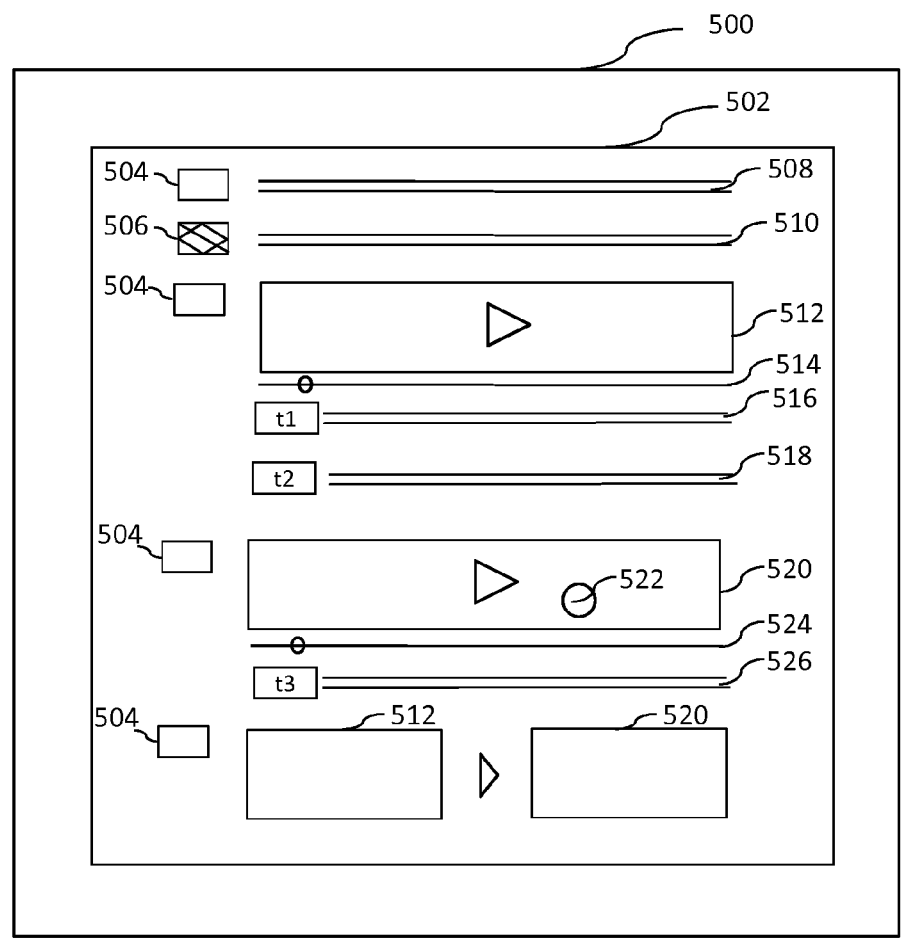
FIG. 5 is an illustration of a message conversation thread between a buyer and a creator, on a user interface of the buyer, in accordance with an embodiment of the present disclosure.

FIG. 5 is an illustration of a user interface 500, which is an example of the buyer interface 212a, displaying a message conversation thread 502 between a buyer 504 and a creator 506, in accordance with an embodiment of the present disclosure. The message conversation thread 502 includes messages, pictures and videos shared among the buyer 504 and creator 506. The message conversation thread 502 may be implemented on the user interfaces of the buyer 504 and creator 506 using at least one of instant messenger, Skype™, etc.

In the message conversation thread 502, the buyer 504 posts a message 508, in response to which the creator 506 posts a message 510. Thereafter, the buyer 504 downloads a starting video file 512 uploaded by the creator 506. The starting video file 512 has a time bar 514, which enables a user to move to any point in the starting video 512. The buyer 504 may pause the starting video file 512 at time t1 of the time bar 514 to display a starting frame, and provide a comment 516 for the starting frame. Similarly, the buyer 504 may pause the starting video file 512 at time t2 of the time bar 514 to display another starting frame, and provide a comment 516 for the same. The comments 516 and 518 are displayed along with timestamps t1 and t2 of the time bar 514, and are saved in the data storage 208. In one embodiment, the timestamps t1 and t2 are linked to the time bar 514, as clicking a time stamp automatically moves the time bar 514 to display the corresponding frame in the starting video file 512.

In response to comments 516 and 518 of the buyer 504, the creator 506 may modify/update the starting video 512 and share an updated video 520 with the buyer 504. In one embodiment, in the updated video 520, the buyer comments 516 and 518 may be added as annotations 522 to corresponding video frames. The buyer 504 may again pause the updated video 520 at a timestamp t3 of corresponding time bar 524, and provide a comment 526 therein. The comment 526 is displayed along with timestamp t3 of the time bar 524, and is saved in the data storage 208. The buyer 504 may also view the starting video 512 and updated video 520 simultaneously so as to do a comparison thereon and provide further comments/feedback.

Figure 6:
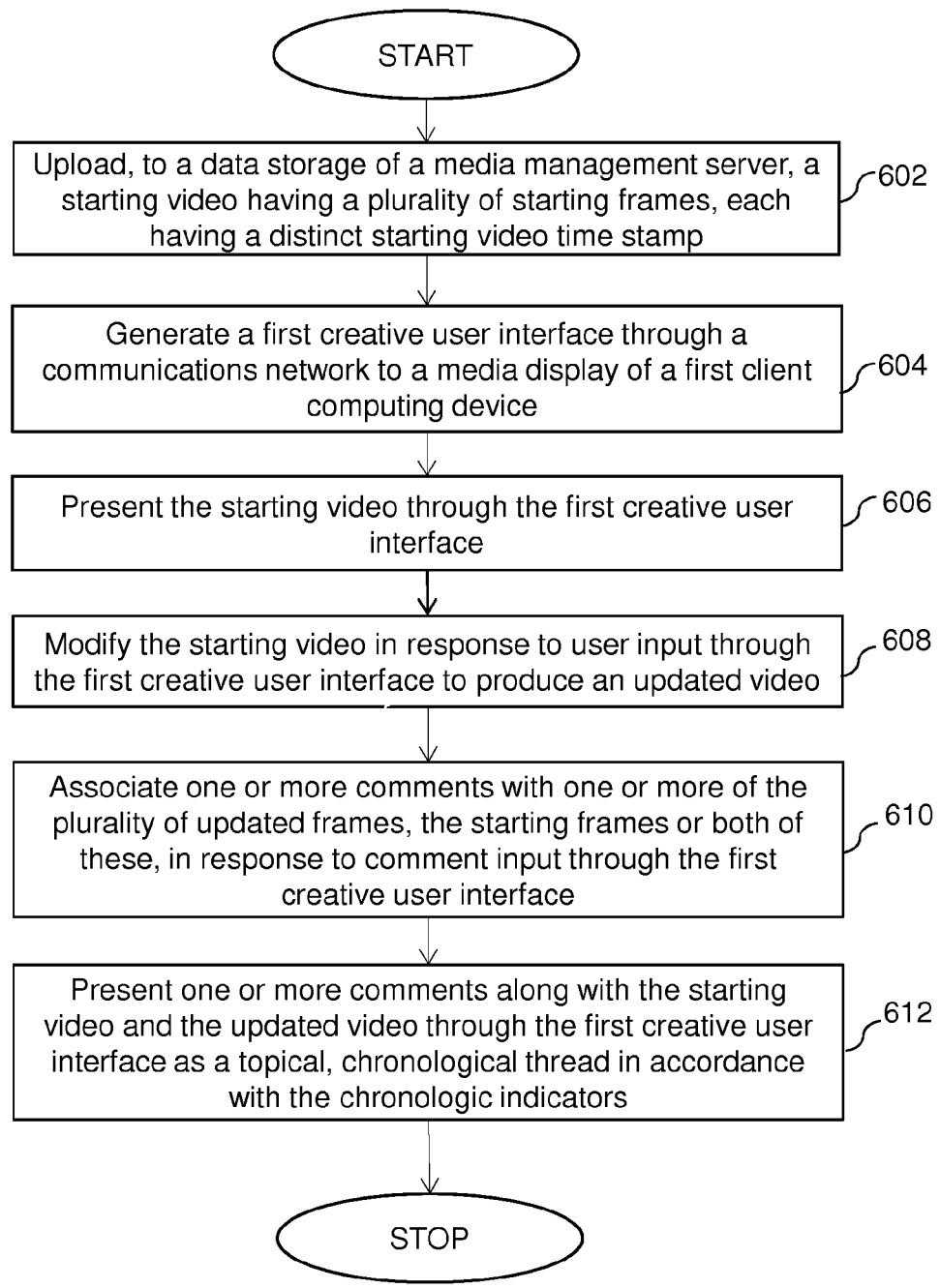
FIG. 6 is an illustration of steps of a method of creation of a video project, in accordance with an embodiment of the present disclosure.

FIG. 6 is an illustration of steps of a method creating a video project in accordance with an embodiment of the present disclosure, and has been explained in conjunction with FIG. 2. The method is depicted as a collection of steps in a logical flow diagram, which represents a sequence of steps that can be implemented in hardware, software or a combination thereof.

At a step 602, a starting video is uploaded to a data storage 208 of a media management server 200. The starting video has a plurality of starting frames, each having a distinct starting video time stamp.

At a step 604, a first user interface 212a is generated through a communication network 108, to a media display of a first client computing device 201a.

At a step 606, the starting video is presented through the first user interface 212a.

At a step 608, the starting video is modified in response to user input through the first user interface 212a to produce an updated video. The updated video has a plurality of updated frames each having a distinct updated video time stamp corresponding to the distinct starting video time stamps of the starting frames.

At a step 610, one or more comments are associated with the starting and updated frames in response to comment input through the first user interface 212a. Associating one or more comments may include tagging each comment with a chronological indicator.

At a step 612, one or more comments are presented along with the starting video and the updated video through the first user interface 212a as a topical, chronological thread in accordance with the chronologic indicators.

It should be noted here that the steps 602 to 612 are only illustrative and other alternatives can also be provided where one or more steps are added, one or more steps are removed, or one or more steps are provided in a different sequence without departing from the scope of the claims herein.

Embodiments of the present disclosure substantially eliminate, or at least partially address, problems in the prior art, enabling the buyers and creators to effectively manage the process of video creation and delivery at one place, thereby reducing the transactional cost, steps and time involved in the management of video creation. The video creation platform stores all the steps involved in producing the video and facilitate real-time communication between the buyers and creators towards the delivery of the final product. The video creation platform facilitates sharing of large sized video files among users, management of shared files, marking-up of the shared files with buyer's comments, linking the mark-up comments with timestamps of corresponding video file, instant messaging thread of discussions, multi user interaction, and payment management among buyers and creators.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

Embodiments of the present disclosure are susceptible to being used for various purposes, including, though not limited to, video creation and delivery among multiple users, sharing of large sized video files and real-time communication among multiple users.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer-implemented method for creation of a video project, comprising:
   uploading, to a data storage operatively coupled with a media management server, a starting video having a plurality of starting frames each having a distinct starting video time stamp;
   generating a first user interface through a communications network to a media display of a first client computing device;
   modifying the starting video in response to user input through the first user interface to produce an updated video having a plurality of updated frames each having a distinct updated video time stamp corresponding to one of the distinct starting video time stamps of the plurality of starting frames;
   sharing the updated video through the first user interface;
   in response to user input through the first user interface, associating with one or more of the plurality of updated frames, the starting frames or both of these, one or more comments pertaining to the one or more of the plurality of updated frames, the starting frames or both; and
   presenting, at least one of the one or more comments along with the starting video and the updated video through the first user interface as a topical, chronological thread in which the at least one comment, the starting video and the updated video are presented in an order corresponding to that of the associating, uploading and sharing.

2. The method as set forth in claim 1, wherein presenting the starting video and the updated video through the user interface further comprises presenting simultaneously such that each presented starting frame is synchronized with the one of the plurality of updated frames which has a distinct updated video time stamp corresponding to the distinct starting video time stamp of the presented starting frame.

3. The method as set forth in claim 1, further comprising presenting the starting video and the updated video through the user interface simultaneously such that no presented starting frame is synchronized with any updated frame which has a distinct updated video time stamp corresponding to the distinct starting video time stamp of the presented starting frame.

4. The method as set forth in claim 1, further comprising, with the first user interface, programming a compensation timeline such that individual successive video creation tasks of the video project are associated with individual partial payments of a total video project compensation.

5. The method as set forth in claim 4, further comprising forwarding, to a second client computing device, a request for one of the individual partial payments when the associated one of the individual successive video creation tasks is completed.

6. The method as set forth in claim 1, further comprising delivering one or more messages regarding the starting video, the updated video, the one or more comments or all of these from a first user interface to a second user interface through the media management server in real time.

7. The method as set forth in claim 1, wherein modifying the starting video further comprises adding annotations directly to one or more of the frames of the starting video.

8. The method as set forth in claim 1, wherein associating the one or more comments further comprises associating the one or more comments with a single one of the plurality of starting frames or a single one of the plurality of updated frames when user input is received while the single one of the plurality of updated frames or the single one of the plurality of starting frames is being presented.

9. The method as set forth in claim 1, further comprising presenting the one or more of the plurality of updated frames in response to a user engaging, through the first user interface, the one or more comments associated with the one or more of the plurality of updated frames.

10. The method as set forth in claim 1, further comprising transmitting an invitation to a second user interface in response to a user employing the first user interface to grant an access permission to a user of the second user interface.

11. A system for creation of a video project, comprising:
    a media management server;
    a data storage;
    a memory;
    a processing unit;
    and a network interface;
    wherein the media management server is configured to employ the network interface to receive, over a communications network and from a first client computing device, a starting video having a plurality of starting frames each having a distinct starting video time stamp;
    wherein the media management server is configured to store the starting video at the data storage;
    wherein the media management server is configured to generate, over the communications network, a first user interface to a media display of the client computing device;
    wherein the media management server is configured to modify the stored starting video in response to user input through the first user interface to produce an updated video having a plurality of updated frames each having a distinct updated video time stamp corresponding to one of the distinct starting video time stamps of the plurality of starting frames;
    wherein the media management server is configured to share the updated video through the first user interface;
    wherein, in response to user input through the first user interface, the media management server is configured to associate with one or more of the plurality of updated frames, the starting frames or both of these, one or more comments pertaining to the one or more of the plurality of updated frames, the starting frames or both; and wherein the media management server is further configured to present at least one of the one or more comments along with the starting video and the updated video to the first user interface as a topical, chronological thread in which the at least one comment, the starting video and the updated video are arranged in an order corresponding to that in which the one or more comments are associated, the starting video is stored and the updated video is shared.

12. The system as set forth in claim 11, wherein the media management server is further configured to present the starting video and the updated video through the first user interface simultaneously such that each presented starting frame is synchronized with the one of the plurality of updated frames which has a distinct updated video time stamp corresponding to the distinct starting video time stamp of the presented starting frame.

13. The system as set forth in claim 11, wherein the media management server is further configured to present the starting video and the updated video through the user interface simultaneously such that no presented starting frame is synchronized with any updated frame which has a distinct updated video time stamp corresponding to the distinct starting video time stamp of the presented starting frame.

14. The system as set forth in claim 11, wherein the media management server is further configured to receive input through the first user interface to program a compensation timeline such that individual successive video creation tasks of the video project are associated with individual partial payments of a total video project compensation.

15. The system as set forth in claim 14, wherein, when one of the individual successive video creation tasks is completed, the media management server is further configured to employ the network interface to forward, over the communications network and to a second client computing device, a request for the individual partial payment associated with the completed one of the individual successive video creation tasks.

16. The system as set forth in claim 11, wherein the media management server is configured to employ the network interface to send, through the communications network to a second user interface, one or more real-time private messages regarding the starting video, the updated video, the one or more comments or all of these and input from the first user interface.

17. The system as set forth in claim 11, wherein the media management server is further configured to modify the starting video further by, adding annotations directly to one or more of the starting frames.

18. The system as set forth in claim 11, wherein, when user input is received while a single one of the plurality of updated frames or a single one of the plurality of starting frames is being presented, the media management server is configured to associate the one or more comments with the single one of the plurality of updated frames or the plurality of starting frames.

19. The system as set forth in claim 11, wherein the media management server is further configured to present the one or more of the plurality of updated frames in response to a user engaging, through the first user interface, the one or more comments associated with the one or more of the plurality of updated frames.

20. The system as set forth in claim 11, wherein the media management server is further configured to employ the network interface to transmit, over the communications network, an invitation to a second user interface in response to a user employing the first user interface to grant an access permission to a user of the second user interface.

* * * * *